(12) United States Patent
Nukui (10) Patent No.: US 12,330,591 B2
(45) Date of Patent: Jun. 17, 2025

(54) SLIDABLE CENTER CONSOLE PROVIDED WITH SELECTOR SWITCH

(71) Applicant: Nissan Motor Co., Ltd., Kanagawa (JP)

(72) Inventor: Nanase Nukui, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 316 days.

(21) Appl. No.: 17/754,713

(22) PCT Filed: Oct. 9, 2019

(86) PCT No.: PCT/JP2019/039837
§ 371 (c)(1),
(2) Date: Apr. 8, 2022

(87) PCT Pub. No.: WO2021/070286
PCT Pub. Date: Apr. 15, 2021

(65) Prior Publication Data
US 2023/0136911 A1    May 4, 2023

(51) Int. Cl.
*B60R 7/04* (2006.01)
*B60N 2/02* (2006.01)
(Continued)

(52) U.S. Cl.
CPC .............. *B60R 7/04* (2013.01); *B60N 2/0252* (2013.01); *B60N 2/763* (2018.02); *B60N 2/797* (2018.02);
(Continued)

(58) Field of Classification Search
CPC ........... B60R 7/04; B60R 16/037; B60R 7/06; B60R 2011/0007; B60R 2011/008;
(Continued)

(56) References Cited

U.S. PATENT DOCUMENTS 5,617,929 A * 4/1997 Richardson .............. B60N 2/90
180/326
5,845,735 A * 12/1998 Muller ................... B60K 26/02
180/323
(Continued)

FOREIGN PATENT DOCUMENTS

CN 109515361 A 3/2019
EP 4067166 A1 * 10/2022 ............. B60K 35/00
(Continued)

OTHER PUBLICATIONS

Liu Zhaocai: "Lexux CT 200h The new favorite in the hybrid era" World Cars, Issue 10, pp. 62-67; Oct. 31, 2012 (13 pages).
(Continued)

*Primary Examiner* — Jason S Daniels
(74) *Attorney, Agent, or Firm* — Osha Bergman Watanabe & Burton LLP (57) ABSTRACT

A slidable center console for a vehicle includes a console actuator for changing a slide position of the center console, a selector switch provided on the center console for changing an operation mode of the vehicle, and a console adjustment switch for adjusting the slide position of the center console by using the console actuator.

4 Claims, 6 Drawing Sheets

(51) Int. Cl.
   *B60N 2/75*     (2018.01)
   *B60R 16/037*   (2006.01)

(52) U.S. Cl.
   CPC .......... *B60N 2/0256* (2023.08); *B60N 2/0279* (2023.08); *B60N 2230/20* (2023.08); *B60R 16/037* (2013.01)

(58) Field of Classification Search
   CPC ....... B60R 11/00; B60N 2/0252; B60N 2/763; B60N 2/797; B60N 2/793; B60N 3/001; B60K 20/02
   USPC .... 296/24.34, 37.8, 64, 65.12, 65.13, 65.15, 296/68.18
   See application file for complete search history.

(56) References Cited

U.S. PATENT DOCUMENTS

| | | | |
|---|---|---|---|
| 7,591,498 B2 | 9/2009 | Busha et al. | |
| 7,661,505 B2* | 2/2010 | Spykerman | B60R 7/04 180/326 |
| 10,027,172 B2* | 7/2018 | Colja | H02J 50/12 |
| 10,343,555 B2* | 7/2019 | Tan | B60N 2/02246 |
| 10,377,317 B2* | 8/2019 | Ranganathan | B60N 2/793 |
| 10,583,783 B2* | 3/2020 | Beauregard | B60K 37/00 |
| 11,007,916 B2* | 5/2021 | Schlierf | B60N 2/01 |
| 11,491,931 B2* | 11/2022 | Fujihara | G10L 15/22 |
| 11,505,094 B2* | 11/2022 | Kang | B60R 7/04 |
| 2010/0078954 A1 | 4/2010 | Liu et al. | |
| 2018/0297489 A1* | 10/2018 | Szawarski | B60N 2/28 |
| 2018/0304779 A1* | 10/2018 | Fitzpatrick | B62D 31/003 |
| 2020/0164770 A1* | 5/2020 | Lee | B60Q 1/5035 |

FOREIGN PATENT DOCUMENTS

| | | | | |
|---|---|---|---|---|
| JP | S6291330 A | | 4/1987 | |
| JP | S6291331 A | | 4/1987 | |
| JP | H0424134 A | | 1/1992 | |
| JP | H04122226 U | | 11/1992 | |
| JP | H0911799 A | | 1/1997 | |
| JP | H11101034 A | | 4/1999 | |
| JP | 2004026440 A | * | 1/2004 | |
| JP | 2011065468 A | | 3/2011 | |
| JP | 2018118641 A | | 8/2018 | |
| JP | 2018188082 A | | 11/2018 | |
| WO | WO-2006084968 A2 | * | 8/2006 | ........... B60N 2/4606 |

OTHER PUBLICATIONS

Zhao Ziteng: "Lincoln Navigator American Big Mac" Car owner's friend, Issue 5, pp. 32-37, May 31, 2018 (12 pages).

* cited by examiner

SLIDABLE CENTER CONSOLE PROVIDED WITH SELECTOR SWITCH

TECHNICAL FIELD

The present invention relates to a slidable center console provided with a selector switch.

BACKGROUND ART

Patent Literatures 1 and 2 listed below disclose a movable seat. Since the seat is movable, positional relationship with pedals and a steering wheel is adjustable to realize an optimal driving position. In addition, the Patent Literatures 1 and 2 listed below also discloses a system that enables of presetting plural seat positions (a slide position of a seat, a height level of a seat cushion and a recline angle of a seatback) of a driver's seat. The preset seat positions can be selected by select buttons provided in the system. When a seat position is selected, the selected seat position is actually realized by electronically-controlled actuators (motors) built in the seat. Also realized is a system by which a steering position (tilt and telescopic positions) and positions of door/room mirrors are cooperatively adjustable in addition to the seat position. The above-mentioned select buttons of the system are disposed on a door or the like. Furthermore, there is also a system with which a driving position is automatically selected according to a smart key.

PRIOR-ART LITERATURE

Patent Literature

Patent Literature 1: Japanese Patent Application Publication No. S62-91330
Patent Literature 2: Japanese Patent Application Publication No. S62-91331

SUMMARY OF INVENTION

Problem to be Solved by the Invention

A selector lever for selecting an operation mode (a park mode, a drive mode, a neutral mode, a reverse mode and so on) is also operated while driving. The selector lever was generally disposed on a center tunnel unmovably. Since a cable for mechanically operating a transmission was connected to the selector cable, the selector lever was provided unmovably. However, in an electric vehicle (EV) recently growing popular, an electronically-controlled switch (a selector switch) is equipped instead of a mechanical selector lever. Since exhaust pipes required for an internal combustion engine are not required to be provided in an EV, there is no need to provide a center tunnel. However, a selector switch that may be operated while driving was also provided unmovably with no relation to a driving position, especially to a seat position. An object of the present invention is to provide a movable center console provided with a selector switch that enables adjustment of a position of the selector switch to realize a more optimal driving position.

Means for Solving the Problem

An aspect of the present invention provides a slidable center console for a vehicle. The center console includes a console actuator for changing a slide position of the center console, a selector switch for changing an operation mode of the vehicle, and a console adjustment switch for adjusting the slide position by using the console actuator. Since the selector switch is provided on the center console, a position of the selector switch can be adjusted by the slide of the center console.

Effect of the Invention

According to the aspect, it is possible to set the selector switch at an adequate slide position in accordance with the driving position.

DESCRIPTION OF EMBODIMENTS

Hereinafter, a charge port device according to a center console 1 according to an embodiment will be described with reference to the drawings.

Figure 1:
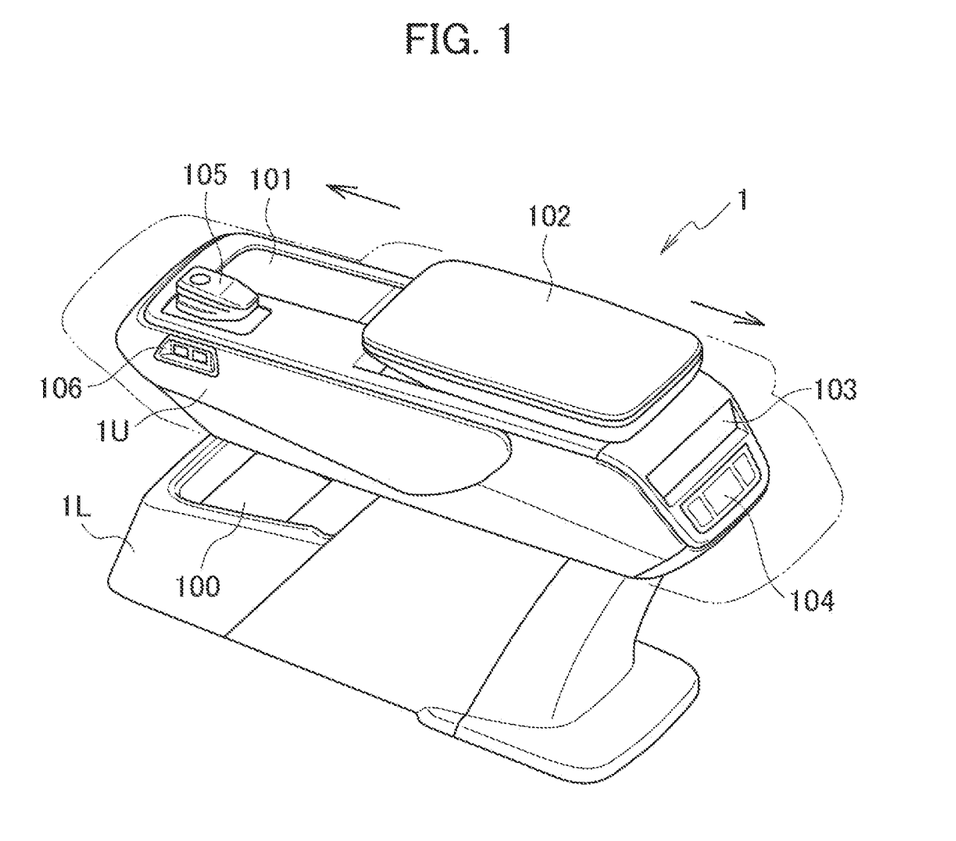
FIG. 1 is a perspective view of a center console according to an embodiment.
Figure 2:
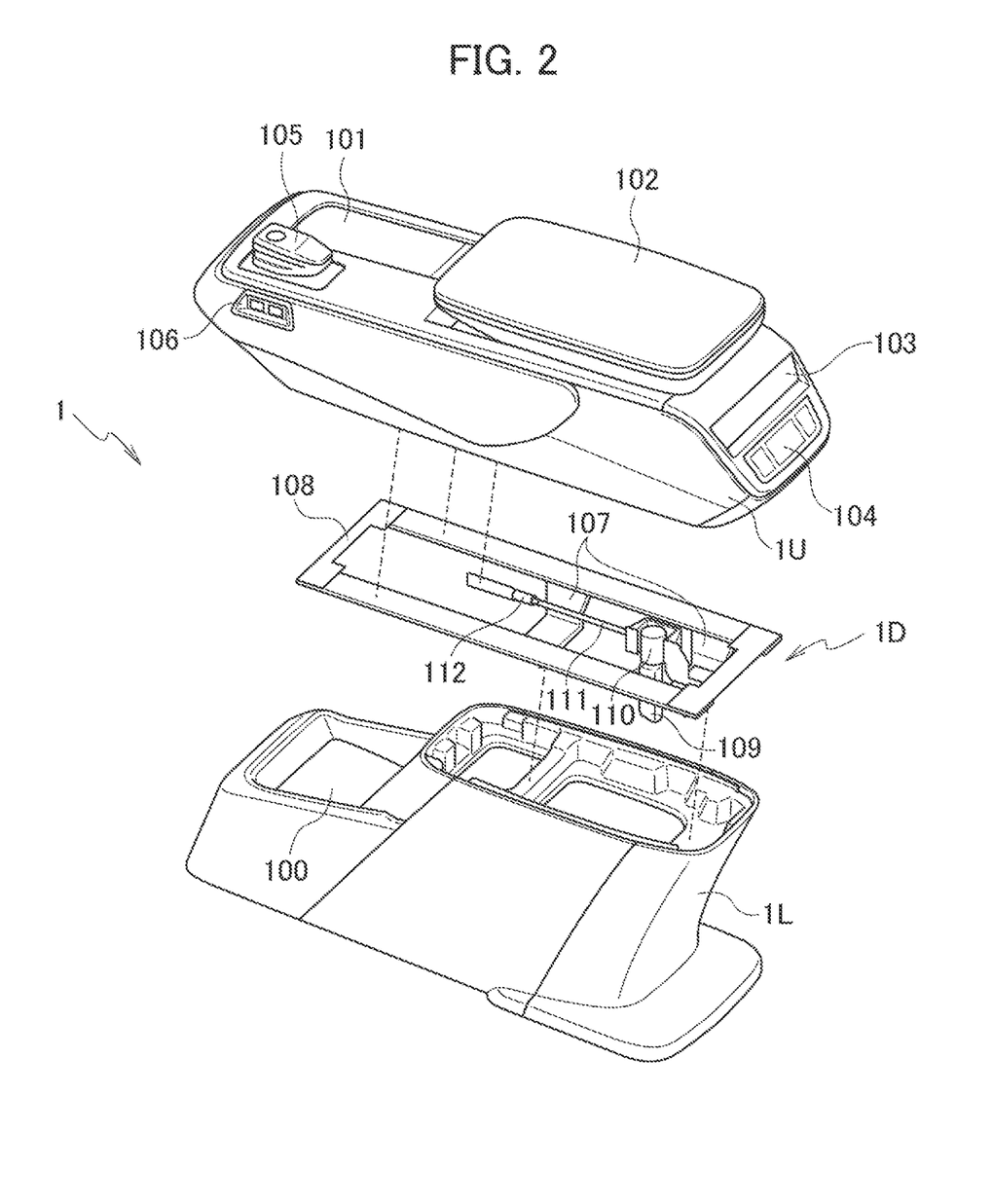
FIG. 2 is an exploded perspective view of the center console.

As shown in FIG. 1 and FIG. 2, the center console 1 according to the present embodiment includes a lower unit 1L, an upper unit 1U, and a drive unit 1D. The lower unit 1L is fixed on a floor of a cabin of a vehicle. The upper unit 1U is slidable in a longitudinal direction on the lower unit 1L. The drive unit 1D is provided between the lower unit 1L and the upper unit 1U. The drive unit 1D slides the upper unit 1U with respect to the lower unit 1L by electric power. Note that the vehicle of the present embodiment is a battery electric vehicle (BEV).

The lower unit 1L is fixed on the flat floor on which no center tunnel is formed. A pocket 100 is provided at a lower front portion of the lower unit 1L. Although not being shown in the drawings, harnesses and an air-conditioner duct are disposed within the lower unit 1L. Note that the air-conditioner duct is connected to an after-explained blower grill 103 of the upper unit 1U. Therefore, the air-conditioner duct is formed such that its length can change according to the slide of the upper unit 1U.

Pockets are formed also within the upper unit 1U, and a passenger such as a drive can access the pockets via an openable slide lid 101 and an openable swing lid 102. The slide lid 101 is opened by sliding a front end of the slide lid 101 backwards. The swing lid 102 is opened by lifting up a front end of the swing lid 102 to swing the swing lid 102 vertically about its hinge at its rear end. The blower grill 103 of the air-conditioner and a rear panel 104 provided with USB connectors, various switches and so on are provided on a rear face of the upper unit 1U.

A selector switch 105 for selecting an operation mode (a park mode, a drive mode, a neutral mode, a reverse mode and so on) is disposed on a driver's side at a front portion on an upper face of the upper unit 1U. The selector switch 105 is an electrical switch and is usually positioned at its default position. A P button is provided on an upper face of the selector switch 105, and the park (P) mode is selected when the P button is pressed. The driver operates the selector switch 105 horizontally when selecting a mode other than the park mode, but the selector switch 105 returns to its default position after the operation.

For example, the neutral (N) mode is selected when shifting the selector switch 105 leftward and then holding it for a while. The reverse (R) mode is selected when shifting the selector switch 105 leftward and then shifting it forward. The drive (D) mode is selected when shifting the selector switch 105 leftward and then shifting it backward. A brake (B) mode is selected when shifting the selector switch 105 leftward and then shifting it backward during the drive mode. The brake mode is a mode during which regenerative braking is exerted more than during the drive mode. The selected mode is displayed by an indicator provided in a meter on an instrument panel 8 (see FIG. 4). The mode is returned to the drive mode when shifting the selector switch 105 leftward and then shifting it backward during the brake mode.

A console adjustment switch 106 for adjusting a slide position of the upper unit 1U is provided on the driver's side at a front portion on a side face of the upper unit 1U. The console adjustment switch 106 in the present embodiment has two buttons aligned in the longitudinal direction, and these buttons are disposed inside a recess. Therefore, the buttons are prevented from being erroneously pressed by an elbow or the like. The upper unit 1U slides forward while the front button is pressed. The upper unit 1U slides rearward while the rear button is pressed. The slide of the center console 1, i.e., the slide of the upper unit 1U with respect to the lower unit 1L is done by the drive unit 1D.

The drive unit 1D includes a bracket 107 fixed to the lower unit 1L, and a slidable frame 108 slidably coupled with the bracket 107. Both side portions of the bracket 107 and the slidable frame 108 are configured as linear guide rails. The upper unit 1U is fixed onto upper faces of the linear guide rails of the slidable frame 108. A drive motor 109 that serves as a console actuator is fixed to the bracket 107. An output shaft of the drive motor 109 is coupled with a feed screw 111 extending in the longitudinal direction via a gear unit 110. An inner-threaded tube 112 is threadedly coupled with the feed screw 111, and a joint tab extended from the inner-threaded tube 112 is fixed with the upper unit 1U.

The feed screw 111 is rotated forward via the gear unit 110 when the drive motor 109 is rotated forward (e.g., by pressing the front button of the console adjustment switch 106). As the result, the inner-threaded tube 112 threadedly coupled with the feed screw 111 is moved forward, and thereby the upper unit 1U slides forward. On the other hand, the feed screw 111 is rotated reversely via the gear unit 110 when the drive motor 109 is rotated reversely (e.g., by pressing the rear button of the console adjustment switch 106). As the result, the inner-threaded tube 112 threadedly coupled with the feed screw 111 is moved rearward, and thereby the upper unit 1U slides rearward In this manner, the drive motor (the console actuator) 109 changes the slide position of the center console 1 (the upper unit 1U). In other words, the slide position of the center console 1 (the upper unit 1U) can be adjusted by the console adjustment switch 106. In the present embodiment, the slide position of the center console 1 (the upper unit 1U) can be adjusted not only arbitrarily by the driver by use of the console adjustment switch 106, but it can be also adjusted automatically by a controller 2 (see FIG. 3). In addition, the slide position of the center console 1 (the upper unit 1U) can be controlled cooperatively with the seat position of the seat 3 and the steering wheel position of the steering unit 4 by the controller 2.

Figure 3:
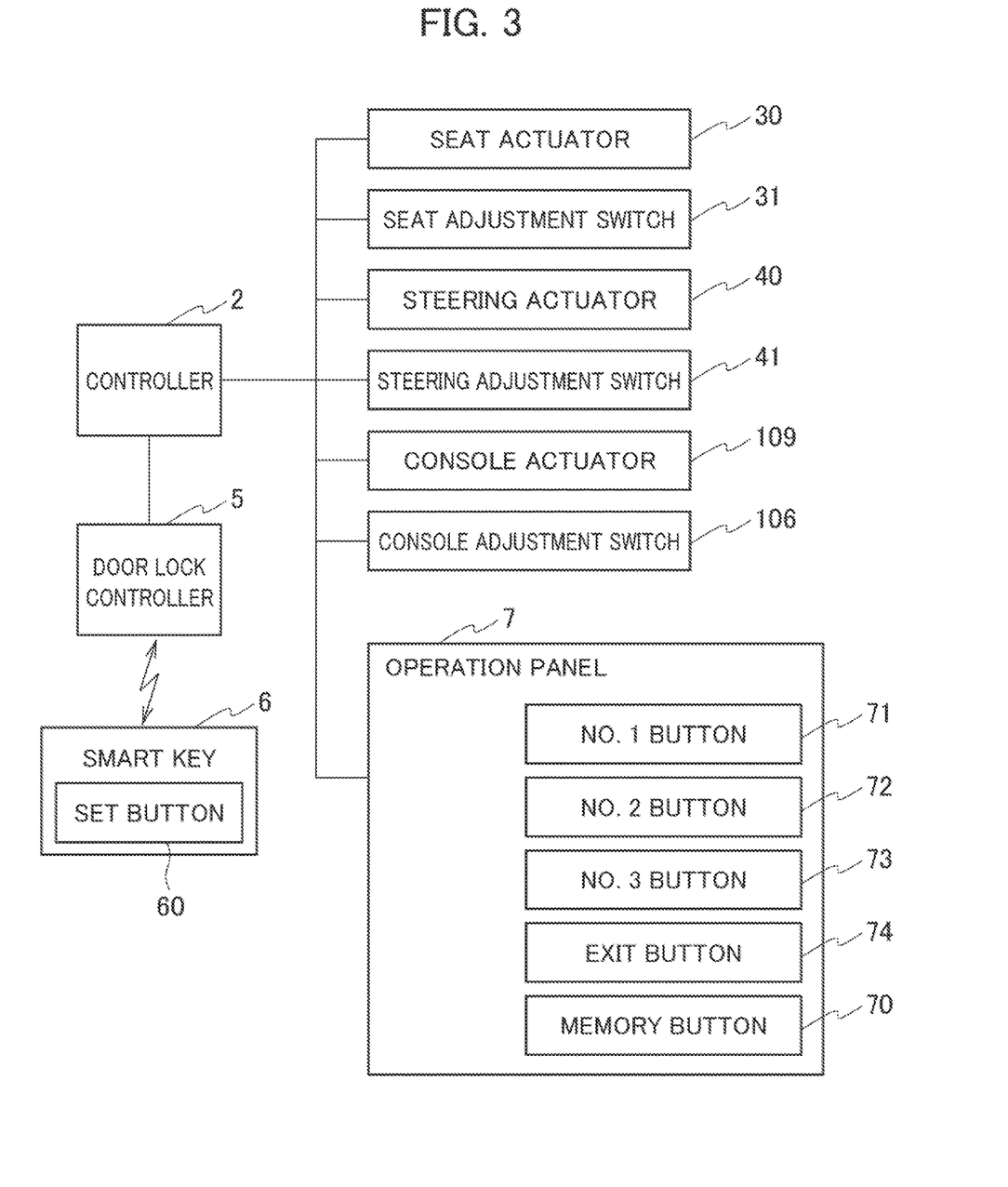
FIG. 3 is a system block diagram of the center console.

The system of the center console 1 will be described with reference to a system block diagram shown in FIG. 3. The controller 2 is an electronic device configured of a CPU, a ROM, a RAM, I/O devices and so on. The controller 2 is connected with the console adjustment switch 106 and the console actuator (the drive motor) 109 that are described above. The controller 2 is also connected with a seat actuator 30 such as motors for changing the seat position of the seat 3. The seat position is determined by a seat slide position, a recline angle of its seatback, a height level of its seat cushion and so on. The seat position may include a setting of a lumber support and an angle of the seat cushion. The seat slide position, the recline angle of the seatback, and the seat height can be changed independently by actuators. The seat position can be adjusted by the driver by use of buttons of a seat adjustment switch 31. In addition, the seat position of the seat 3 can be also adjusted automatically by the controller 2 similarly to the center console 1.

The controller 2 is also connected with a steering actuator 40 such as motors for changing the steering wheel position of the steering unit 4. The steering wheel position is determined by a telescopic stroke and a tilt angle of a steering column. The telescopic stroke and the tilt angle of the steering column can be changed independently by actuators. The steering wheel position can be adjusted by the driver by use of buttons of a steering adjustment switch 41. In addition, the steering wheel position of the steering unit 4 can be also adjusted automatically by the controller 2 similarly to the center console 1 and the seat 3.

An operation panel 7 is also connected with the controller 2. The driver presets his/her driving position by use of the operation panel 7. The driving position includes the seat position of the seat 3, the steering wheel position of the steering unit 4, and the slide position of the center console 1 (i.e., the position of the selector switch 105). The seat position, the steering wheel position and the slide position of the center console 1 that are preset are associated with each other. In addition, the operation panel 7 is also used for moving the seat 3, the steering unit 4 and the center console 1 to achieve the preset driving position. Note that the operation panel 7 may be integrated with the other switches such as the seat adjustment switch 31. The preset driving position is stored in the controller 2 as preset information. Three driving positions can be stored at maximum.

The operation panel 7 includes a memory button 70 for presetting the driving position, i.e., for storing it in the controller 2. In addition, the operation panel 7 also includes a No. 1 button 71, a No. 2 button 72 and a No. 3 button 73 that correspond to the three driving positions, respectively. In other words, the buttons 71 to 73 are selection buttons of the driving position. Furthermore, the operation panel 7 also includes an exit button 74 for moving the seat 3, the steering unit 4 and the center console 1 to their positions that make an exit from the vehicle easy. When presetting the driving position, the memory button 70 and any one of the buttons 71 to 73 are used. When moving the seat 3, the steering unit 4 and the center console 1 to the preset driving position by retrieving the stored preset information, only any one of the buttons 71 to 73 is used.

The controller 2 of the center console 1 is also connected with a door lock controller 5 for controlling a door lock system of the vehicle. The door lock controller 5 can communicate with the smart key 6 wirelessly, and thereby can detect the approach of the smart key 6 to the vehicle, and can retrieve preset information stored in the smart key 6. Although the preset information stored in the smart key 6 is identical to the preset information stored in the controller 2, the preset information stored in the smart key 6 will be described later. The controller 2 of the center console 1 can retrieve the preset information from the door lock controller 5. The smart key 6 is provided with a set button 60.

Figure 4:
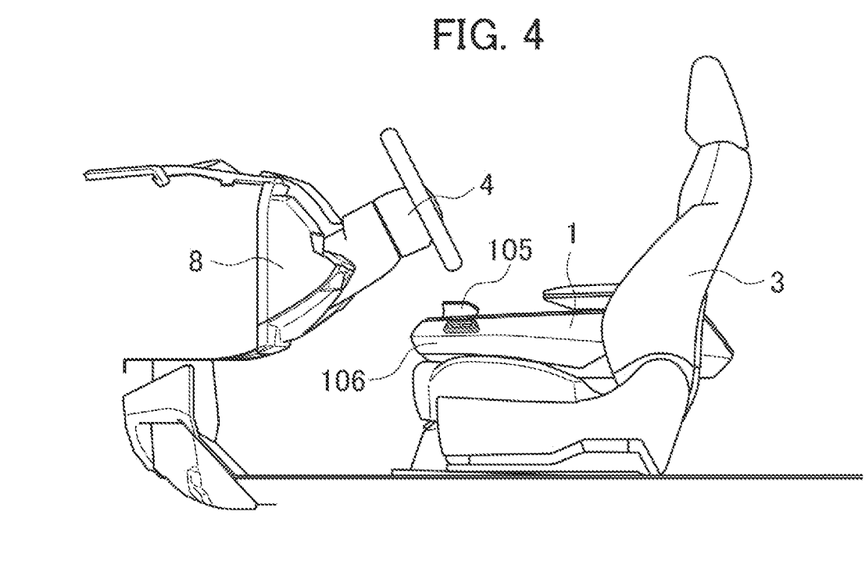
FIG. 4 is a side view showing the center console together with a seat and a steering unit (a preset driving position).
Figure 5:
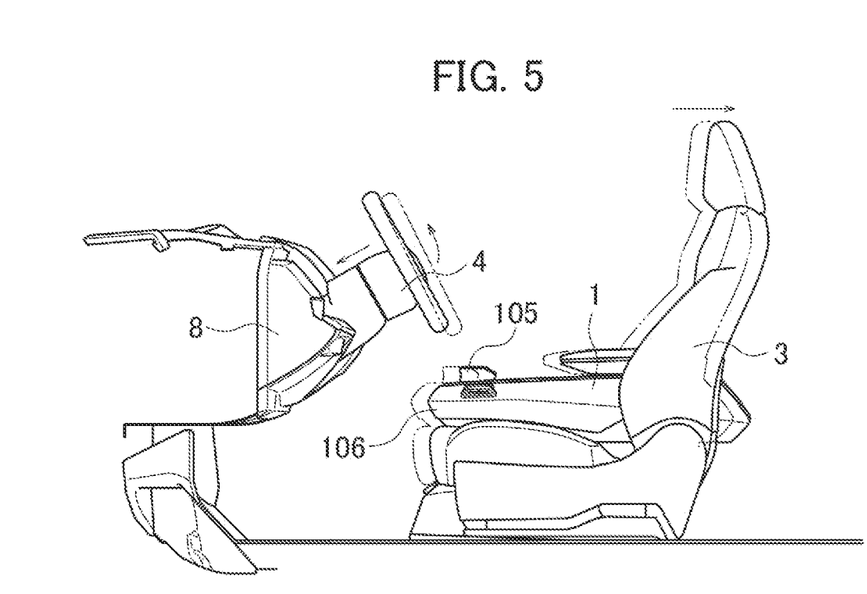
FIG. 5 is a side view similar to FIG. 4 (an exit position).

FIG. 4 shows the preset driving position. When the exit button 74 is pressed or when the controller 2 judges that the driver is going to exit the vehicle, the controller 2 moves the seat 3 rearward by a predetermined slide stroke (e.g., 40 mm) to make the driver's exit from the vehicle easy as shown in FIG. 5. Concurrently, the controller 2 also moves the center console 1 rearward by a predetermined slide stroke (e.g., 40 mm) cooperatively with the backward slide of the seat 3. Simultaneously, the controller 2 moves the steering wheel to an uppermost position with respect to its tilt position and to a foremost position with respect to its telescopic position.

Figure 6:
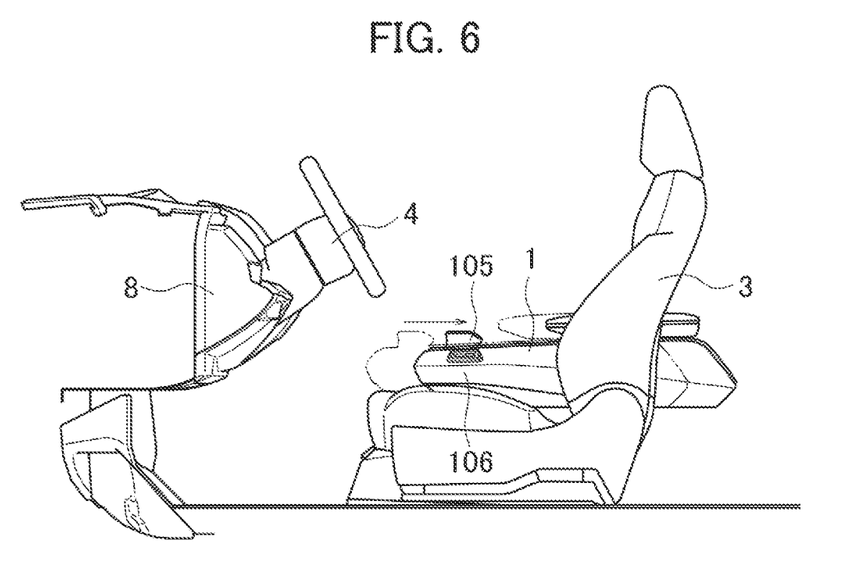
FIG. 6 is a side view similar to FIG. 4 (the center console is arbitrarily slid from the state of FIG. 4).

On the other hand, when the rear button of the console adjustment switch 106 is pressed at the driving position, the center console 1 can be moved rearward according to the operation as shown in FIG. 6. A slidable stroke of the center console 1 in the present embodiment is 150 mm. No center tunnel is provided on the floor of the vehicle in the present embodiment as described above, so that the floor is made flat from the driver's seat to the passenger's seat beneath the instrument panel 8. Therefore, when the center console 1 (the upper unit 1U) is moved to its rearmost position as shown in FIG. 6, the driver can move easily between the driver's seat and the passenger's seat.

Figure 7:
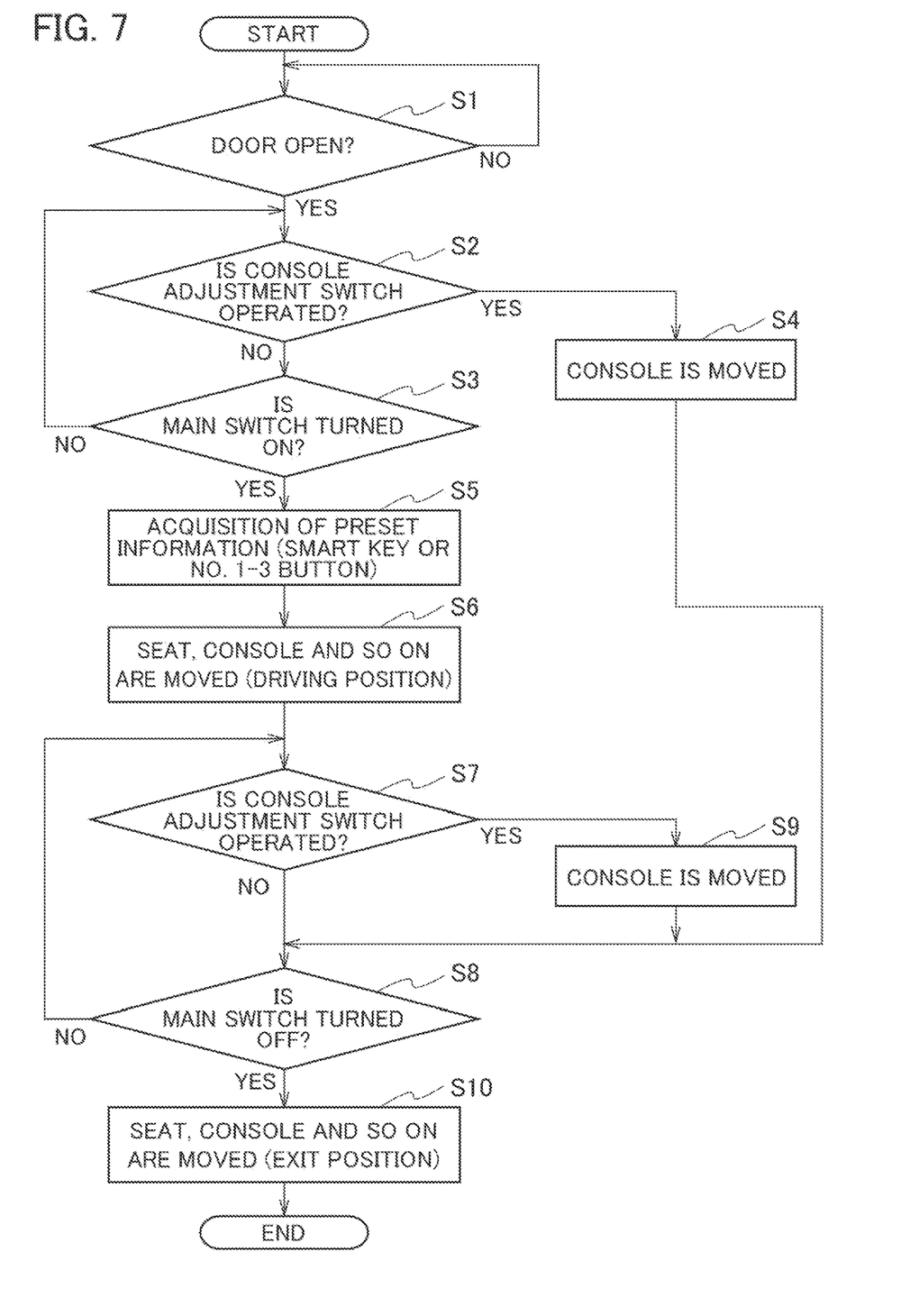
FIG. 7 is a flowchart showing a control of the center console.

Next, an example of operations will be described with reference to a flowchart shown in FIG. 7. The controller 2 keeps communicating with the door lock controller 5 to monitor whether or not the door(s) of the vehicle is opened (step S1). When the door is opened, it is monitored whether or not the console adjustment switch 106 is operated (step S2) until a main switch (a main power switch) for activating the vehicle is powered on (step S3). In a case where a user comes (not to run the vehicle but) to pick up his/her luggage and tries to slide the center console 1, the step S2 is affirmed. When the step S2 is affirmed, the controller 2 slides the center console 1 according to the operation of the console adjustment switch 106 (step S4).

When the step S3 is affirmed by the power-on of the main switch, the controller 2 judges that the vehicle is going to be run and the controller 2 retrieves the preset information (step S5). The preset information is retrieved through pressing of the buttons 71 to 73 of the operation panel 7 as described above (if no operation is done, the seat position and so on are left as they are). In a case of retrieving the preset information automatically, it retrieves the preset information from the smart key 6 via the door lock controller 5. In a case where the preset information stored in the controller 2 is associated with the smart key 6, it specifies the smart key 6 and then retrieves the preset information associated with the specified smart key 6.

Subsequent to the step S5, the seat 3, the steering unit 4 and the center console 1 are moved based on the retrieved preset information, and then an optimal driving position is realized (step S6). After the step S6, it is monitored whether or not the console adjustment switch 106 is operated (step S7) until the main switch is powered off (step S8). There is also a case for moving the center console 1 for any reason after the optimal driving position is realized, the step S7 is affirmed in such a case. When the step S7 is affirmed, the controller 2 slides the center console 1 according to the operation of the console adjustment switch 106 (step S9).

When the step S8 is affirmed by the power-off of the main switch, the controller 2 judges that the use of the vehicle is going to be finished and moves the seat 3, the steering unit 4 and the center console 1 to make the exit from the vehicle easy as shown in FIG. 5 (step S10). In contrast to the driving position shown in FIG. 4. FIG. 5 shows the exit position. Note that it is also possible by a setting that the exit position is not realized after the power-off of the main switch. In such a case, the controller 2 realizes the exit position by moving the seat 3, the steering unit 4 and the center console 1 when the exit button 74 on the operation panel 7 is pressed.

In the present embodiment, in order to make the driver known that the center console 1 and the seat 3 are cooperatively slid, the controller 2 controls their slide strokes and their slide speeds. If the slide strokes of the center console 1 and the seat 3 are identical to each other and the slide speeds of the center console 1 and the seat 3 are identical to each other, the center console 1 and the seat 3 start moving at the same time with their relative speed being zero, and then stops at the same time. In this case, it is difficult for the driver to recognize that the center console 1 is also moved together with the seat 3. If he/she can recognize that the center console 1 also moves together with the seat 3, he/she can pay attention to other passengers or a luggage in the passenger compartment. Specifically, the driver can pay attention to a contact of the center console 1 that is sliding with the other passengers, a contact of the center console 1 that is sliding with the luggage on the floor of the rear seats and so on.

Here, relationship between the slide of the center console 1 and the slide of the seat 3 is important. Therefore, we focus on the seat "slide" position included in the seat position. The height of the seat cushion and the recline angle of the seatback included in the seat position are not important here. The controller 2 (1) makes the slide strokes of the seat 3 and the center console 1 different from each other, or (2) makes the slide speeds of the seat 3 and the center console 1 different from each other, when it cooperatively controls the seat actuator 30 and the console actuator 109.

In the above case (1) of making the slide strokes of the seat 3 and the center console 1 different from each other, if their slide speeds are the same (their relative speed is zero), at least one of starts and stops of their slides are not coincident with each other requisitely. Therefore, the driver can recognize the cooperative slide easily. In order to make the driver known earlier, it is more preferable not to make their starts of the slides coincident than their stops of the slides coincident. On the other hand, the above case (2) is a case where the slide speeds of the seat 3 and the center console 1 are made different from each other, and thereby the relative speed of the seat 3 and the center console 1 are not zero requisitely even when their slide strokes are coincident or not coincident. Therefore, the driver can recognize the cooperative slide easily.

Alternatively, the controller 2 (3) makes their side strokes and their slide speeds coincident with each other and doesn't make their starts of slides coincident with other when it cooperatively controls the seat actuator 30 and the console actuator 109. Their stops of the slides are also not coincident with each other requisitely. In this case, the driver can recognize the cooperative sliding easily, because the starts of their slides are not coincident with each other.

According to the present embodiment, it is possible to slide the center console 1 by the console actuator 109 by use of the console adjustment switch 106. Therefore, it is possible to adjust the position of the selector switch 105 provided on the center console 1. As the result, the optimal driving position can be realized easily.

In addition, in the present embodiment, the slide position of the center console 1 (the selector switch 105) and the seat position of the seat 3 can be controlled cooperatively with each other based on the above-described preset information. Therefore, the optimal driving position can be realized more easily.

Here, in the cooperative control of the seat 3 and the center console 1, (1) the slide strokes of the seat 3 and the center console 1 are made different from each other, or (2) the slide speeds of the seat 3 and the center console 1 are made different from each other. In the case (2), the passenger(s) can recognize that the slide of the center console 1 is also controlled, because the relative speeds of the center console 1 to the seat 3 is not zero. In the case (1), the passenger(s) can recognize that the slide of the center console 1 is also controlled, because the starts or the stops of their slides are not coincident with each other even with their relative speed being zero.

Alternatively, in the cooperative control of the seat 3 and the center console 1, it may be adopted that (3) the slide stroke and the slide speed of the seat 3 are made coincident with the slide stroke and the slide speed of the center console 1, respectively, and the stats of their slides are not made coincident with each other. Since the stats of their slides are not coincident with each other, the stops of their slides are also not coincident with each other requisitely. Since the starts and the stops of their slides are not coincident with each other, the passenger(s) can easily recognize that the slide of the center console 1 is also controlled.

In addition, in the present embodiment, the controller 2 is configured to be capable of receiving the preset information from the smart key 6. In other words, in the cooperative control of the seat 3 and the center console 1, since it is possible to retrieve the preset information in accordance with the owner of the smart key 6, the optimal driving position can be realized more easily. For example, it becomes also possible to realize the optimal driving position automatically in the cooperative control of the seat 3 and the center console 1 just by having the smart key 6.

The present invention is not limited to the embodiment described above. For example, the controller 2 may be integrated with a controller of other equipment (e.g., the door lock controller 5). In addition, the controller 2 may be disposed inside the center console 1, or outside it. In the above embodiment, the controller 2 receives the preset information, which is wirelessly received by the door lock controller 5 from the smart key 6, from the door lock controller 5 through the wired communication. However, the controller 2 may wirelessly receive the preset information directly from the smart key 6.

The vehicle in the above embodiment is a BEV, but is not limited to this. The vehicle may be a vehicle equipped only with an internal combustion engine, a hybrid electric vehicle (an HEV), or the like. In the above embodiment, the slide of the center console 1 is done by the slide of the upper unit 1U with respect to the lower unit 1L. It may be done by sliding a whole of the center console 1 with respect to the floor of the cabin. In addition, the center console 1, the seat 3 and the steering unit 4 are controlled cooperatively, but other component (e.g., door/room mirrors) may be further controlled cooperatively.

REFERENCE SIGNS LIST

1 center console
1L lower unit
1U upper unit
1D drive unit
105 selector switch
106 console adjustment switch
109 drive motor (console actuator)
2 controller
3 seat
30 seat actuator
6 smart key

The invention claimed is:

1. A slidable center console for a vehicle comprising:
a console actuator for changing a slide position of the center console;
a selector switch provided on the center console for changing an operation mode of the vehicle; and
a console adjustment switch for adjusting the slide position of the center console by using the console actuator.

2. The center console according to claim 1,
wherein the seat position includes at least a seat slide position, and
wherein the controller makes a slide stroke of the seat and a slide stroke of the center console different from each other, or makes a slide speed of the seat and a slide speed of the center console different from each other, when cooperatively controlling the seat actuator and the console actuator.

3. The center console according to claim 1,
wherein the seat position includes at least a seat slide position, and
wherein the controller makes a slide stroke and a slide speed of the seat and a slide stroke and a slide speed of the center console coincident with each other, respectively, and doesn't make a start of a slide of the seat and a start of a slide of the center console coincident with each other, when cooperatively controlling the seat actuator and the console actuator.

4. The center console according to claim 1, wherein the controller is configured to be capable of receiving the preset information from a smart key.

* * * * *